US011884290B2

(12) United States Patent
Takahashi (10) Patent No.: US 11,884,290 B2
(45) Date of Patent: Jan. 30, 2024

(54) VEHICLE SPEED COMMAND GENERATION DEVICE AND VEHICLE SPEED COMMAND GENERATION METHOD

(71) Applicant: MEIDENSHA CORPORATION, Tokyo (JP)

(72) Inventor: Toshimichi Takahashi, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/780,927

(22) PCT Filed: Aug. 21, 2020

(86) PCT No.: PCT/JP2020/031609
§ 371 (c)(1),
(2) Date: May 27, 2022

(87) PCT Pub. No.: WO2021/106290
PCT Pub. Date: Jun. 3, 2021

(65) Prior Publication Data
US 2022/0410924 A1   Dec. 29, 2022

(30) Foreign Application Priority Data

Nov. 29, 2019   (JP) .................................. 2019-216247

(51) Int. Cl.
*B60W 60/00*   (2020.01)
*B60W 30/14*   (2006.01)
(Continued)

(52) U.S. Cl.
CPC ............ *B60W 60/00* (2020.02); *B60W 30/14* (2013.01); *B60W 30/143* (2013.01); *B60W 30/188* (2013.01); *G01M 17/007* (2013.01)

(58) Field of Classification Search
CPC .... B60W 60/00; B60W 30/143; B60W 30/14; B60W 30/188; G01M 17/007
See application file for complete search history.

(56) References Cited

U.S. PATENT DOCUMENTS

2015/0203117 A1*   7/2015   Kelly .................. F16H 61/0213
701/91

FOREIGN PATENT DOCUMENTS

CN   108349493 A * 7/2018 ........... B60K 26/021
JP   H09-113418 A   5/1997
(Continued)

*Primary Examiner* — Nga X Nguyen
(74) *Attorney, Agent, or Firm* — Muncy, Geissler, Olds & Lowe, P.C.

(57) ABSTRACT

This vehicle speed command generation device 1 generates a target vehicle speed command to be used by a vehicle speed control device. The vehicle speed command generation device 1 comprises: a shift processing unit 12 that receives an original vehicle speed command and generates each of a reference vehicle speed command in which the original vehicle speed command is delayed by a reference delay time, a first-out vehicle speed command in which the original vehicle speed command is delayed by a first-out delay time that is shorter than the reference delay time, and a delayed vehicle speed command in which the original vehicle speed command is delayed by a second delay time that is longer than the reference delay time; and a correction processing unit 16 that generates a target vehicle speed command by using the first-out vehicle speed command and the delayed vehicle speed command.

17 Claims, 8 Drawing Sheets

(51) Int. Cl.
*B60W 30/18* (2012.01)
*B60W 30/188* (2012.01)
*G01M 17/007* (2006.01)

(56) References Cited

FOREIGN PATENT DOCUMENTS

| | | | | |
|---|---|---|---|---|
| JP | 3613974 B2 | * | 1/2005 | ....... F16H 61/66254 |
| JP | 2011-085460 A | | 4/2011 | |
| JP | 2016-008925 A | | 1/2016 | |
| JP | 2016008925 A | * | 1/2016 | |
| JP | 2016156687 A | * | 9/2016 | |
| JP | 2017-053768 A | | 3/2017 | |
| JP | 2019-105506 A | | 6/2019 | |

* cited by examiner

VEHICLE SPEED COMMAND GENERATION DEVICE AND VEHICLE SPEED COMMAND GENERATION METHOD

TECHNICAL FIELD

The present invention relates to a vehicle speed command generation device and a vehicle speed command generation method. In more detail, it relates to a vehicle speed command generation device and a vehicle speed command generation method which generate a vehicle speed command to be used as the input to a vehicle speed control device of an automated driving operation apparatus.

BACKGROUND ART

Vehicle testing such as durability testing, exhaust purification performance evaluation testing and fuel consumption measurement testing are performed by actually running the real vehicle on the rollers of a chassis dynamometer, for example. In the development stage of a vehicle, driving of the actual vehicle may be performed by an automated driving operation apparatus in place of a human. The automated driving operation apparatus drives actuators based on a vehicle speed command corresponding to the speed of the vehicle to be realized, and thus operates the accelerator pedal, brake pedal, shift lever, etc. of the vehicle. Driving of the vehicle following the predetermined vehicle speed command is called mode operation.

In the case of evaluating the durability performance, exhaust purification performance, fuel consumption, etc. of the vehicle in this way as the result of mode operation performed by the automated driving operation apparatus in place of a human, in the automated driving operation apparatus used in such testing it is desired for operation of the vehicle closer to human to be possible in addition to being loyal to the vehicle speed command. Patent Document 1 shows a control method of the automated driving operation apparatus with the purpose of realizing such operation of the vehicle close to human.

However, in mode operation, the shape of the waveform of the target vehicle speed to be realized in the actual vehicle is strictly decided in the standards, etc. according to the testing contents. However, in actual testing, a certain amount of deviation is permitted in the vehicle speed realized by the actual vehicle considering various measurement errors. Hereinafter, the range in which deviation is permitted from the vehicle speed command value is also referred to as tolerance.

With the technology of Patent Document 1, rather than using a predetermined signal according to a standard, etc. (hereinafter referred to as "original vehicle speed command") as the vehicle speed command inputted to the automated driving operation apparatus, the operation of the vehicle closer to human is attempted to be realized by the automated driving operation apparatus by using a signal obtained by conducting moderating on this original vehicle speed command. In other words, since points at which the slope of vehicle speed discontinuously changes may be included in the original vehicle speed command (refer to FIG. 5 described later), if inputting such an original vehicle speed command to the automated driving operation apparatus as is, sudden acceleration/deceleration may be demanded in the automated driving operation apparatus, and the realized vehicle speed change may be an unnatural change not realized in human operation. In contrast, the technology of Patent Document 1 attempts to realize operation of the vehicle close to human with the automated driving operation apparatus, by inputting the vehicle speed command generated so as to smoothly change within the range of tolerance by conducting moderating on the original vehicle speed command to the automated driving operation apparatus, it.

However, with the moderating of Patent Document 1, a smooth vehicle speed command to be inputted to the automated driving operation apparatus is generated by specifying positions such as the minimal point for the permitted vehicle speed upper-limit value (i.e. upper limit value of above-mentioned tolerance) or maximal point of the permitted vehicle speed lower-limit value (i.e. lower limit value of the above-mentioned tolerance), calculating a smooth correction curve passing through this minimal point and/or maximal point, and further calculating a weighted average of this correction curve and a vehicle speed command value based on the original vehicle speed command. For this reason, with the technology of Patent Document 1, since it is necessary to calculate the correction curve before starting the testing, and adjusting the value of the weighting function of the weighted average, there is concern over taking a long time before starting the testing.

In contrast, Patent Document 2 by the applicants of the present disclosure shows a vehicle speed command generation device which can generate a vehicle speed command that can realize smooth operation close to human by the automated driving operation apparatus, by way of simple serial processing without going through advance batch processing such as that shown in Patent Document 1.

With the vehicle speed command generation device shown in Patent Document 2, the permitted vehicle speed upper-limit value and permitted vehicle speed lower-limit value are obtained, and the vehicle speed command is generated based on the average values of this permitted vehicle speed upper-limit value and permitted vehicle speed lower-limit value. The average values of this permitted vehicle speed upper-limit value and permitted vehicle speed lower-limit value change earlier than the original vehicle speed command during transition such that discontinuous change appears in the slope of the vehicle speed command value based on the original vehicle speed command; therefore, it is possible to suppress rapid acceleration/deceleration more than a case of inputting the original vehicle speed command to the automated driving operation apparatus as is.

Patent Document 1: Japanese Unexamined Patent Application, Publication No. H9-113418

Patent Document 2: Japanese Unexamined Patent Application, Publication No. 2019-105506

DISCLOSURE OF THE INVENTION

Problems to be Solved by the Invention

However, with the vehicle speed command generation device shown in Patent Document 2, not only the original vehicle speed command, but also information of the upper limit value and lower limit value for the tolerance becomes necessary. However, the controllers called a driver's aid which are currently widely being used as a controller giving inputs to the automated driving operation apparatus often do not include a function of outputting information related to tolerances. For this reason, the vehicle speed command generation device shown in Patent Document 2 may not be able to generate a vehicle speed command using an existing driver's aid.

The present invention has an object of providing a vehicle speed command generation device and vehicle speed command generation method which can generate a vehicle speed command capable of realizing smooth operation close to human by an automated driving operation apparatus by way of serial processing without using information related to tolerances.

Means for Solving the Problems

A vehicle speed command generation device (for example, the vehicle speed command generation device 1, 1A described later) according to a first aspect of the present invention is for a vehicle speed control device (for example, the vehicle speed control device 2 described later) of an automated driving operation apparatus that, when a vehicle speed command corresponding to a speed of a vehicle to be realized is inputted, is inputted, operates the vehicle according to the vehicle speed command, the vehicle speed command generation device generating a vehicle speed command to be used by a vehicle speed control device, including: a shift processing unit (for example, the shift processing unit 12 described later) which receives an original vehicle speed command, and generates: a reference vehicle speed command in which the original vehicle speed command is delayed by a reference delay time; a first-out vehicle speed command in which the original vehicle speed command is delayed by a first delay time which is shorter than the reference delay time; and a delayed vehicle speed command in which the original vehicle speed command is delayed by a second delay time which is longer than the reference delay time; and a correction processing unit (for example, the correction processing unit 16, 16A described later) which generates the vehicle speed command by correcting the reference vehicle speed command using the first-out vehicle speed command and the delayed vehicle speed command.

According to a second aspect of the present invention, in this case, it is preferable for the reference delay time to be longer than a first shift time obtained by subtracting the first delay time from the reference delay time, and longer than a second shift time obtained by subtracting the reference delay time from the second delay time.

According to a third aspect of the present invention, in this case, it is preferable for the correction processing unit to generate a correction signal for the reference vehicle speed command based on the reference vehicle speed command, the first-out vehicle speed command and the delayed vehicle speed command, and to generate the vehicle speed command by summing the reference vehicle speed command and the correction signal.

According to a fourth aspect of the present invention, in this case, it is preferable for the correction processing unit to include: an incremental slope operator (for example, the incremental slope operator 162 described later) which calculates an incremental slope value by dividing a value arrived at by subtracting a value of the delayed vehicle speed command from a value of the first-out vehicle speed command, by a differential time (for example, the total shift time described later) obtained by subtracting the first delay time from the second delay time; a differential operator (for example, the differential operator 161 described later) which calculates a differential of a value of the reference vehicle speed command; and an integrator (for example, the integrator 167 described later) which generates the correction signal by integrating a value obtained by subtracting the differential from the incremental slope value.

According to a fifth aspect of the present invention, in this case, it is preferable for the correction processing unit to include: an incremental slope operator (for example, the incremental slope operator 162 described later) which calculates an incremental slope value by dividing a value arrived at by subtracting a value of the delayed vehicle speed command from a value of the first-out vehicle speed command, by a differential time obtained by subtracting the first delay time from the second delay time; a differential operator (for example, the differential operator 161 described later) which calculates a differential of a value of the reference vehicle speed command; an integrator (for example, the integrator 167 described later) which calculates an integral of a value obtained by subtracting the differential from the incremental slope value; and a multiplier (for example, the multiplier 169 described later) which generates the correction signal by multiplying a correction factor of a value between 0 and 1 by the integral.

A vehicle test system according to a sixth aspect of the present invention includes: the vehicle speed command generation device (for example, the vehicle speed command generation device 1, 1A described later) as described in any one of the first to fifth aspects; an original vehicle speed command generation device (for example, the driver's aid 5 described later) which generates the original vehicle speed command; a vehicle speed control device (for example, the vehicle speed control device 2 described later) which controls an automated driving operation apparatus based on the vehicle speed command generated by the vehicle speed command generation device; and a measuring device (for example, the measuring device 6 described later) which measures performance of the vehicle, in which the measuring device operates synchronously with a signal delaying the original vehicle speed command by the reference delay time, or the reference vehicle speed command.

A vehicle speed command generation method according to a seventh aspect of the present invention is for a vehicle speed control device of an automated driving operation apparatus that, when a vehicle speed command corresponding to speed of a vehicle to be realized is inputted, operates a vehicle according to the vehicle speed command, the vehicle speed command generation method generating the vehicle speed command to be used in the vehicle speed control device, the method including steps of: receiving an original vehicle speed command, and generating a reference vehicle speed command in which the original vehicle speed command is delayed by a reference delay time, a first-out vehicle speed command in which the original vehicle speed command is delayed by a first delay time shorter than the reference delay time, and a delayed vehicle speed command in which the original vehicle speed command is delayed by a second delay time longer than the reference delay time; and generating the vehicle speed command by correcting the reference vehicle speed command using the first-out vehicle speed command and the delayed vehicle speed command.

Effects of the Invention

In the first aspect of the present invention, the shift processing unit receives the original vehicle speed command sent from the driver's aid, for example, and generates the reference vehicle speed command, first-out vehicle speed command and delayed vehicle speed command by delaying this original vehicle speed command by the reference delay time, first delay time and second delay time, and the correction processing unit generates the vehicle speed command by correcting the reference vehicle speed command using the first-out vehicle speed command and delayed vehicle speed command. Herein, the first delay time is shorter than the reference delay time, and the second delay time is longer than the reference delay time. For this reason, the waveforms of the first-out vehicle speed command and the delayed vehicle speed command are the same as the original vehicle speed command; however, the first-out vehicle speed command changer before the reference vehicle speed command, and the delayed vehicle speed command changes after the reference vehicle speed command. For this reason, by correcting the reference vehicle speed command using this first-out vehicle speed command and delayed vehicle speed command, it is possible to correct the reference vehicle speed command so that the change in slope of the vehicle speed command value becomes smooth during such a transition that discontinuous change appears in the slope of the vehicle speed command value (i.e. acceleration) based on the reference vehicle speed command. For this reason, it is possible to generate a vehicle speed command such that it is possible to realize smooth operation close to human by the automated driving operation apparatus, without using information related to tolerances. In addition, since the present invention generates a vehicle speed command using the reference vehicle speed command, first-out vehicle speed command and delayed vehicle speed command generated by delaying the original vehicle speed command sent from the driver's aid, it is possible to generate a vehicle speed command such that can realize smooth operation by serial processing, while receiving the original vehicle speed command.

In the second aspect of the present invention, as explained by referencing FIG. 3 later, the permitted vehicle speed upper limit value and permitted vehicle speed lower limit value are decided so as to also maintain a fixed time criteria (i.e. criteria along the time axis), not only a fixed vehicle speed criteria (i.e. criteria along speed axis) relative to the vehicle speed command value. In contrast, the present invention sets the reference delay time (time differential between original vehicle speed command and reference vehicle speed command) to be longer than the first shift time (time differential between first-out vehicle speed command and reference vehicle speed command) and the second shift time (time differential between reference vehicle speed command and delayed vehicle speed command). It is thereby possible to generate a vehicle speed command such that the change in slope of the vehicle speed command value becomes smooth within the range permitted by the tolerance, by way of serial processing.

The correction processing unit in the third aspect of the present invention generates a correction signal for the reference vehicle speed command based on the reference vehicle speed command, first-out vehicle speed command and delayed vehicle speed command, and generates the vehicle speed command by summing the reference vehicle speed command and correction signal. It is thereby possible to generate the vehicle speed command such that it is possible to realize smooth operation close to human by the automated driving operation apparatus, based on the reference vehicle speed command in which the original vehicle speed command is delayed by the reference delay time.

In the fourth aspect of the present invention, the incremental slope operator calculates the incremental slope value by dividing, by the differential time obtained by subtracting the first delay time from the second delay time, a value arrived at by subtracting the value of the delayed vehicle speed command from the value of the first-out vehicle speed command, the differential operator calculates the differential of the value of the reference vehicle speed command, and the integrator generates a correction signal by integrating the value obtained by subtracting the differential from the incremental slope value. It is thereby possible to configure so as not to correct the reference vehicle speed command for a portion having no great change in the slope of the reference vehicle speed command value based on the reference vehicle speed command, and correct the reference vehicle speed command so that this change in slope becomes gentle for a portion in which a great change arises in the slope of the reference vehicle speed command value based on the reference vehicle speed command.

In the fifth aspect of the present invention, the incremental slope operator calculates the incremental slope value by dividing, by the differential time obtained by subtracting the first delay time from the second delay time, a value arrived at by subtracting the value of the delayed vehicle speed command from the value of the first-out vehicle speed command, the differential operator calculates the differential of the value of the reference vehicle speed command, the integrator generates the integral of a value obtained by subtracting the differential from the incremental slope value, and the multiplier generates a correction signal by multiplying a correction factor of a value between 0 and 1 by the integrated value. It is thereby possible to configure so as not to correct the reference vehicle speed command for a portion having no great change in the slope of the reference vehicle speed command value based on the reference vehicle speed command, and correct the reference vehicle speed command so that this change in slope becomes gentle for a portion in which a great change arises in the slope of the reference vehicle speed command value based on the reference vehicle speed command. In addition, according to the present invention, it is possible to adjust the magnitude of the correction signal, by adjusting the value of the correction factor between 0 and 1. It is thereby possible to make the value of the correction factor approach 1 in a portion such that overshoot tends to occur, and greatly change the vehicle speed command from the reference vehicle speed command, and possible to make the value of the correction factor to approach 0 in a portion such that deviates from the tolerance, and make the vehicle speed command approach the reference vehicle speed command.

In the sixth aspect of the present invention, the vehicle speed command generated by the vehicle speed command generation device as mentioned above is delayed by the reference delay time relative to the original vehicle speed command generated by the original vehicle speed command generation device. For this reason, in the vehicle test system, when meaning the performance of the vehicle operated by the automated driving operation apparatus based on the vehicle speed command generated by the vehicle speed command generation device, by way of the measuring device running synchronously with the original vehicle speed command, a time difference may arise by the reference delay time, and it may no longer be possible to accurately measure. In contrast, the present invention can realize accurate measurement by the measuring device, by causing the measuring device to run synchronously with a signal in which the original vehicle speed command is delayed by the reference delay time, or the reference vehicle speed command.

The seventh aspect of the present invention, for example, receives the original vehicle speed command sent from the driver's aid, for example, and generates the reference vehicle speed command, first-out vehicle speed command and delayed vehicle speed command by delaying this original vehicle speed command by the reference delay time, first delay time and second delay time, and further generates the vehicle speed command by correcting the reference vehicle speed command using this first-out vehicle speed command and delayed vehicle speed command. It is thereby possible to correct the reference vehicle speed command so that the change in slope of the vehicle speed command value becomes smooth during such a transition that discontinuous change appears in the slope of the vehicle speed command value based on the reference vehicle speed command. For this reason, it is possible to generate a vehicle speed command such that it is possible to realize smooth operation close to human by the automated driving operation apparatus, without using information related to tolerances. In addition, since the present invention generates a vehicle speed command using the reference vehicle speed command, first-out vehicle speed command and delayed vehicle speed command generated by delaying the original vehicle speed command sent from the driver's aid, it is possible to generate a vehicle speed command such that can realize smooth operation by serial processing, while receiving the original vehicle speed command.

PREFERRED MODE FOR CARRYING OUT THE INVENTION

First Embodiment

Figure 1:
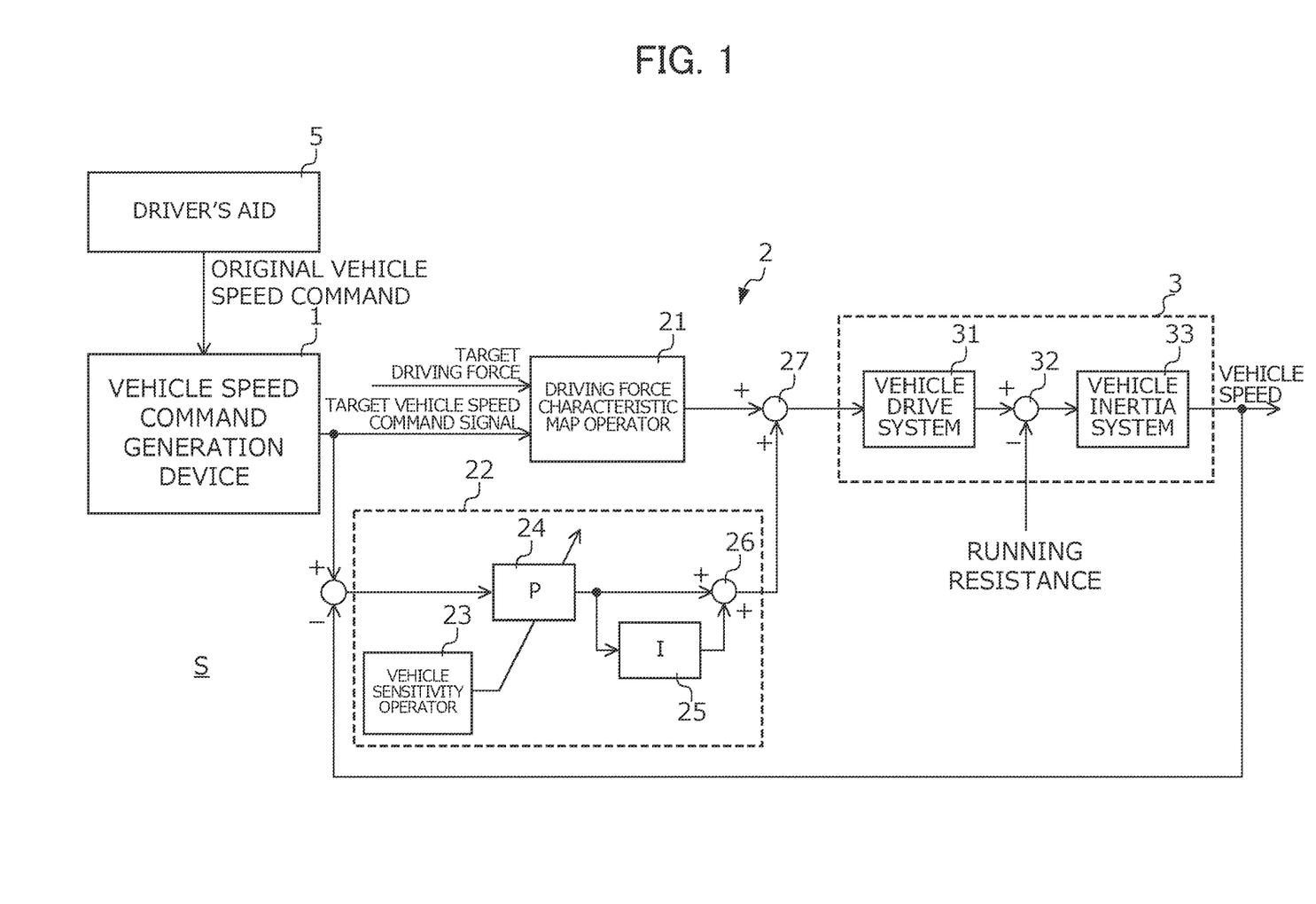
FIG. 1 is a view showing the configuration of a control system of a vehicle test system to which a vehicle speed command generation device and vehicle speed command generation method according to a first embodiment of the present invention are applied.

Hereinafter, a first embodiment of the present invention will be explained in detail while referencing the drawings. FIG. 1 is a view showing the configuration of a control system of a vehicle test system S to which a vehicle speed command generation device 1 and vehicle speed command generation method according to the present embodiment are applied.

The vehicle test system S includes a driver's aid 5, vehicle speed command generation device 1, vehicle speed control device 2, and controlled object 3. The controlled object 3, for example, includes a chassis dynamometer which generates running resistance simulating an actual road surface, and a vehicle as a test object mounted to this chassis dynamometer. The automated driving operation apparatus which operates, according to commands, the devices of the vehicle required in order to make a vehicle travel such as an accelerator pedal, brake pedal, shift lever and ignition switch is mounted to the driver seat of the vehicle. The driver's aid 5 generates an original vehicle speed command, and sends this to the vehicle speed command generation device 1. The vehicle speed command generation device 1 calculates a vehicle speed command value corresponding to the speed of the vehicle to be realized at each time, and generates a vehicle speed command according to this vehicle speed command value and inputs it to the vehicle speed control device 2. The vehicle speed control device 2 controls the automated driving operation apparatus so as to realize the inputted vehicle speed command (in other words, so that the actual vehicle speed of the vehicle traces the vehicle speed command value).

It should be noted that FIG. 1 shows only a portion related to determination of the accelerator opening command, which is the input to the accelerator actuator among the plurality of actuators constituting the automated driving operation apparatus. The actuators operating the brake pedal, shift lever, etc. are also included in the automated driving operation apparatus in addition to the accelerator actuator which operates the accelerator pedal of the vehicle; however, illustration and detailed explanations for configurations which determine inputs to these are omitted. Hereinafter, the configurations of the vehicle speed command generation device 1 and vehicle speed control device 2 will be explained in order.

Figure 2:
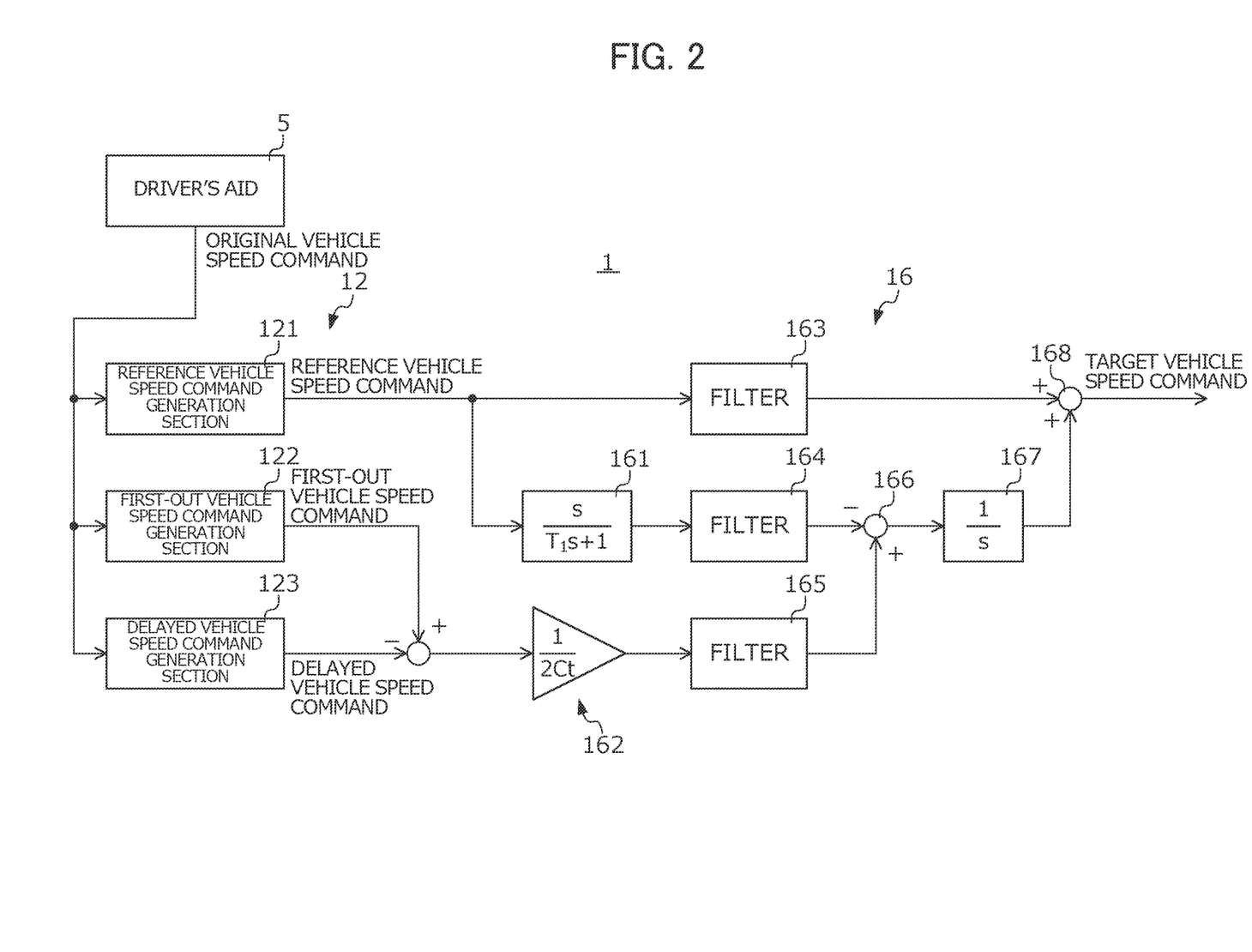
FIG. 2 is a view showing the configuration of a control circuit of the vehicle speed command generation device.

FIG. 2 is a view showing the configuration of a control circuit of the vehicle speed command generation device 1. The vehicle speed command generation device 1 includes: a shift processing unit 12 which receives an original vehicle speed command sent from the driver's aid 5 and generates three vehicle speed commands (reference vehicle speed command, first-out vehicle speed command and delayed vehicle speed command described later) by conducting shift processing described later on the received vehicle speed command; and a correction processing unit 16 which generates a target vehicle speed command based on the three vehicle speed commands sent from the shift processing unit 12.

The driver's aid 5 generates the original vehicle speed command set in advance according to a standard or the like according to test contents, and sends this original vehicle speed command to the shift processing unit 12. Herein, "vehicle speed command" is a waveform of the target vehicle speed, i.e. a set of data in which a plurality of times and the value of speed of the vehicle to be realized at each time (hereinafter also referred to as "vehicle speed command value") are associated. Herein, a permitted vehicle speed range (hereinafter referred to as "tolerance") is decided in the original vehicle speed command value. Hereinafter, the upper limit value of the tolerance is referred to as permitted vehicle speed upper limit value, and the lower limit value of the tolerance is referred to as permitted vehicle speed lower limit value.

Figure 3:
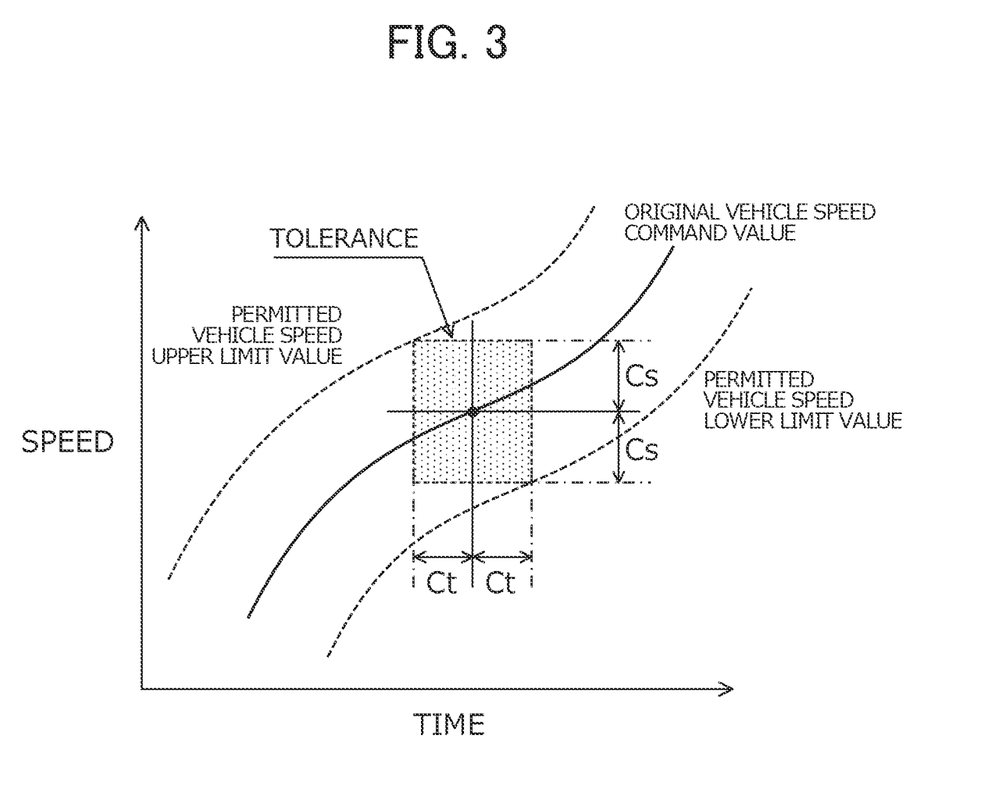
FIG. 3 is a graph showing a relationship between an original vehicle speed command value, permitted vehicle speed upper limit and permitted vehicle speed lower limit.

FIG. 3 is a graph showing the relationship between the original vehicle speed command value, permitted vehicle speed upper limit value, and permitted vehicle speed lower limit value. In FIG. 3, the solid line indicates an example of the original vehicle speed command value, and the two dashed lines show examples of the permitted vehicle speed upper limit value and permitted vehicle speed lower limit value for this original vehicle speed command value.

As mentioned above, a value decided according to a standard or the like can be used as the original vehicle speed command value. However, in an actual test, various calculation errors are considered in the vehicle speed to be realized by the actual vehicle, and some degree of deviation is permitted. The dashed-line frame of FIG. 3 shows the tolerance, which is the range of deviation permitted in the original vehicle speed command value at a certain time. This tolerance is decided according to a standard or the like, similarly to the original vehicle speed command value.

As shown by the dashed-line frame of FIG. 3, the tolerance relative to the original vehicle speed command value at a certain time, is decided so as to maintain not only speed criteria of a predetermined width (i.e. criteria along speed axis in FIG. 3), but also time criteria of a predetermined width (i.e. criteria along time axis in FIG. 3). According to one standard decided in Japan, the speed criteria is +/−2 (km/h), and the time criteria is +/−1 (s). The tolerance relative to the original vehicle speed command in this way is decided so that both the speed criteria and time criteria are secured; therefore, the permitted vehicle speed upper limit value and permitted vehicle speed lower limit value at each time respectively make an envelope curve of tolerance at each time, as shown by the dashed lines in FIG. 3.

Hereinafter, a case is explained in which the speed criteria is defined as +/−Cs (km/h) (Cs is a positive predetermined value), and the time criteria is defined as +/−Ct(s) (Ct is a positive predetermined value). In addition, although a case is explained of the units of vehicle speed being defined as (km/h) hereinafter, the units of vehicle speed may be defined as (mph).

Referring back to FIG. 2, although the permitted vehicle speed upper limit value and permitted vehicle speed lower limit value are also decided in the above way relative to the original vehicle speed command value, a case is explained hereinafter in which the driver's aid 5 uses a device including a function of outputting only the original vehicle speed value.

The shift processing unit 12 includes a reference vehicle speed command generation section 121, first-out vehicle speed command generation section 122, and delayed vehicle speed command generation section 123.

The reference vehicle speed command generation section 121 successively generates reference vehicle speed commands by delaying this original vehicle speed command by a reference delay time decided in advance, while receiving the original vehicle speed command. Therefore, the reference vehicle speed command varies later than the original vehicle speed command.

The first-out vehicle speed command generation section 122 successively generates first-out vehicle speed commands by delaying this original vehicle speed command by a first delay time shorter than the above-mentioned reference delay time, while receiving the original vehicle speed command. Therefore, the first-out vehicle speed command changes later than the original vehicle speed command; however, it changes before the reference vehicle speed command.

The delayed vehicle speed command generation section 123 successively generates delayed vehicle speed commands by delaying this original vehicle speed command by a second delay time longer than the above-mentioned reference delay time, while receiving the original vehicle speed command. Therefore, the delayed vehicle speed command changes later than the original vehicle speed command, first-out vehicle speed command and reference vehicle speed command.

Figure 4:
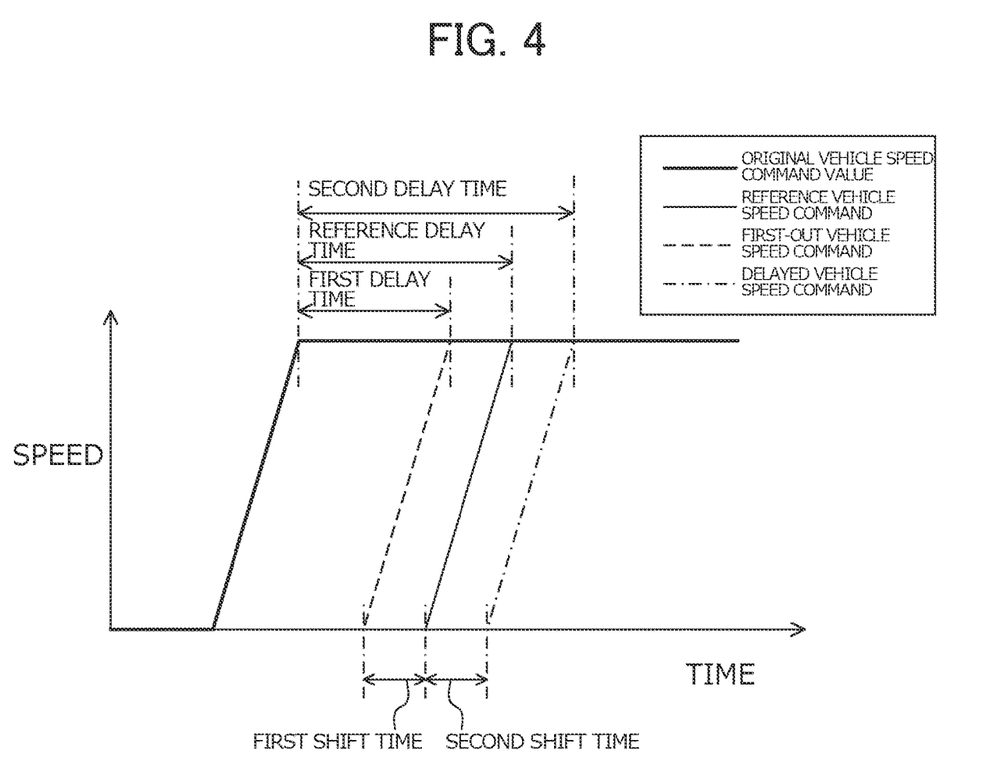
FIG. 4 is a graph showing the relationship between an original vehicle speed command, reference vehicle speed command, first-out vehicle speed command and delayed vehicle speed command.

FIG. 4 is a graph showing the relationship between the original vehicle speed command, reference vehicle speed command, first-out vehicle speed command and delayed vehicle speed command. As shown in FIG. 4, for these four vehicle speed commands, the shapes of the waveforms are all the same; however, they change in the order of original vehicle speed command, first-order vehicle speed command, reference vehicle speed command and delayed vehicle speed command.

Hereinafter, the time difference between the first-out vehicle speed command and the reference vehicle speed command (reference delay time−first delay time) is called first shift time. In addition, the time difference between the reference vehicle speed command and delayed vehicle speed command (second delay time−reference delay time) is called second shift time.

First, the reference delay time is set to any length; however, it is set to be longer than at least the first shift time and second shift time.

In addition, although a case of the first shift time and second shift time being equal is explained hereinafter, the present invention is not to be limited thereto. The first shift time and second shift time may be set to different lengths. In addition, although a case of the first and second shift times being set to the same length as the aforementioned time criteria Ct is explained hereinafter, the present invention is not to be limited thereto. This first and second shift times may be set to be shorter or may be set to be longer than the time criteria Ct; however, in order to configure so that the realized vehicle speed will not depart from the tolerance, these first and second shift times are preferably closer to the time criteria Ct. In addition, hereinafter, the time obtained by subtracting the first delay time from the second delay time, i.e. time obtained by totaling the first shift time and the second shift time, is called the total shift time. Therefore, in the case of defining the first and second shift times as Ct as described above, the total shift time is 2 Ct.

Referring back to FIG. 2, while receiving the reference vehicle speed command, first-out vehicle speed command and delayed vehicle speed command sent from the shift processing unit 12, the correction processing unit 16 successively generates a target vehicle speed command by correcting the reference vehicle speed command using this reference vehicle speed command, first-out vehicle speed command and delayed vehicle speed command.

The correction processing unit 16 includes: a differential operator 161, incremental slope operator 162, first filter 163, second filter 164, third filter 165, subtracter 166, integrator 167, and adder 168. It should be noted that "s" in FIG. 2 is a Laplace operator.

The differential operator 161 calculates the differential of the reference vehicle speed command value by conducting a differential operation on the reference vehicle speed command sent from the shift processing unit 12. More specifically, the differential operator 161 calculates the derivative of the reference vehicle speed command value, by conducting pseudo differentiation characterized by the predetermined time constant $T_1$ as shown in FIG. 2 on the reference vehicle speed command.

The incremental slope operator 162 calculates the incremental slope value by dividing, by the total shift time 2 Ct, a value arrived at by subtracting the delayed vehicle speed command value from a first-out vehicle speed command value sent from the shift processing unit 12.

The filters 163, 164 and 165 are low-pass filters outputted by removing the noise of the high-frequency component from each input. More specifically, the first filter 163 removes noise form the reference vehicle speed command value sent from the shift processing unit 12, the second filter 164 removes the noise from the derivative of the reference vehicle speed command value calculated by the differential operator 161, and the third filter 165 removes the noise from the incremental slope value calculated by the incremental slope operator 162.

The subtracter 166 subtracts the derivative of the reference vehicle speed command value having gone through the second filter 164 from the incremental slope value having gone through the third filter 165. The integrator 167 generates a correction signal for the reference vehicle speed command by integrating the difference between the incremental slope value calculated by the subtracter 166 and the derivative of the reference vehicle speed command value.

The adder 168 generates the target vehicle speed command by summing the reference vehicle speed command having gone through the first filter 163 and the correction signal generated by the integrator 167.

Next, referring back to FIG. 1, the configuration of the vehicle speed control device 2 will be explained. The vehicle speed control device 2, for example, performs tracking control of the target vehicle speed command, by a control method combining feed-forward control and PI control using a driving force characteristic map as shown in FIG. 1. Hereinafter, the specific configuration of this vehicle speed control device 2 will be explained.

A driving force characteristic map operator 21 has a driving force characteristic map (not illustrated) in which a predetermined input (target vehicle speed command and target driving force) and an aperture of the accelerator pedal of the vehicle are associated. As this driving force characteristic map, a map prepared by performing experiments in advance on the vehicle which is the test object can be used. The driving force characteristic map operator 21 retrieves the aforementioned driving force characteristic map, when the target vehicle speed command generated in the above way and the target driving force determined by processing which is not shown are inputted, and determines the accelerator aperture according to these inputs.

A vehicle speed feedback operator 22 includes a vehicle sensitivity operator 23, a proportional operator 24, an integral operator 25 and an adder 26. The vehicle sensitivity operator 23 calculates the reciprocal of the sensitivity of the vehicle (driving force change/accelerator aperture change), using the same driving force characteristic map as the one possessed by the above-mentioned operator 21. The proportional operator 24 multiplies a proportional gain which is controllable according to the vehicle sensitivity by the vehicle speed deviation (target vehicle speed command− actual vehicle speed). The integral operator 25 integrates the output of the proportional operator 24. The adder 26 adds the output of the proportional operator 24 and the output of the integral operator 25.

The above such output of the driving force characteristic map operator 21 and output of the vehicle speed feedback operator 22 are added by the adder 27, and inputted to the controlled object 3 as an accelerator aperture command for the aperture of the accelerator pedal. The vehicle which is the controlled object 3 and the chassis dynamometer system are divided into a vehicle drive system 31, adder 32 and vehicle inertia system 33. When the accelerator aperture command is inputted, the vehicle drive system 31 generates driving force according to this. The acceleration force of the vehicle obtained by subtracting the rolling resistance generated by the chassis dynamometer system from the driving force generated by the vehicle drive system 31 is inputted to the vehicle inertia system 33. When the acceleration force of the vehicle is inputted, the vehicle inertia system 33 generates the vehicle speed according to this.

Although the specific configuration of the vehicle speed control device 2 has been explained above, the present invention is not to be limited thereto. It may be any configuration so long as including a tracking function to the target vehicle speed command in the vehicle speed command device 2.

Figure 5:
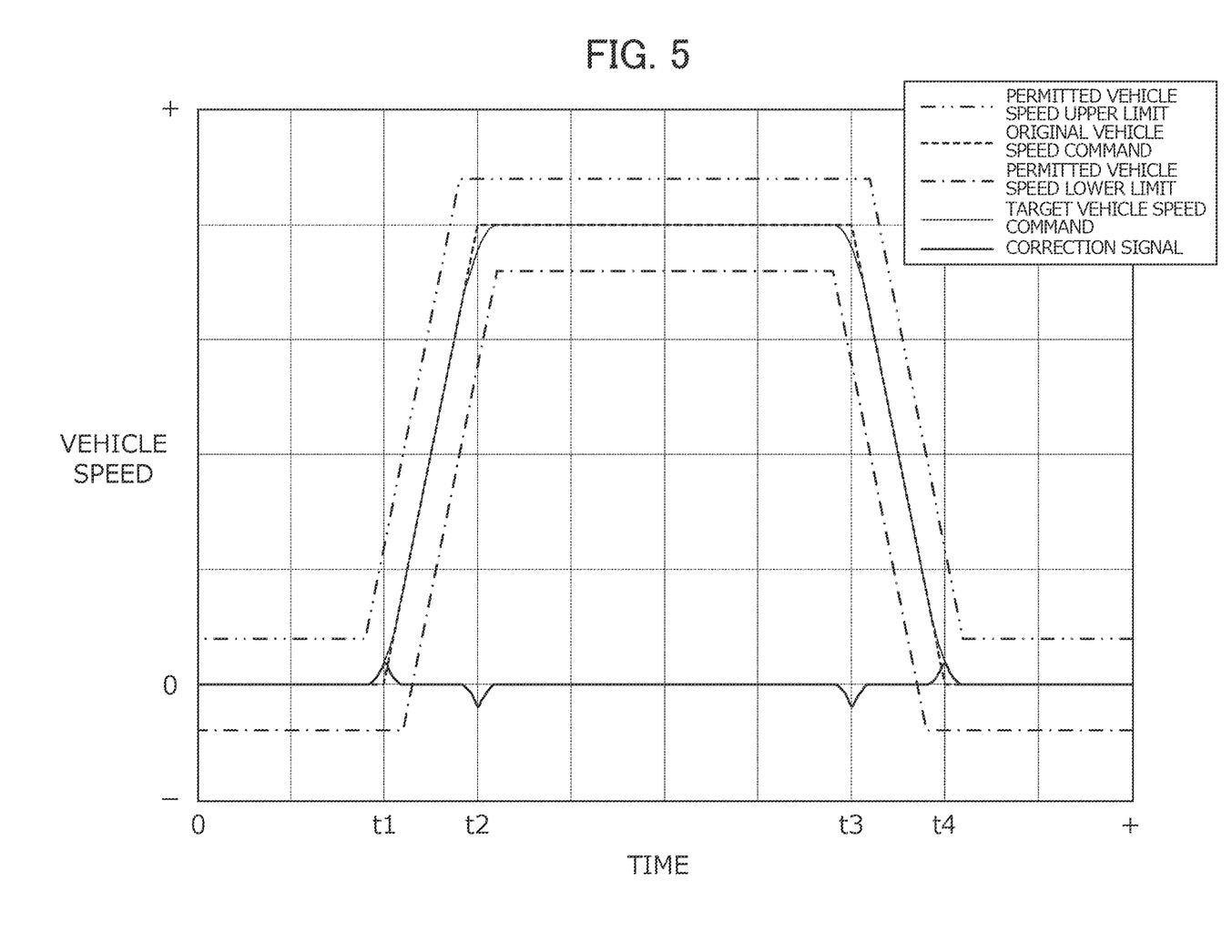
FIG. 5 is a graph showing the waveform of a target vehicle speed command generated by the vehicle speed command generation device.

FIG. 5 is a graph showing the waveform of the target vehicle speed command generated by the vehicle speed command generation device 1. FIG. 5 shows the original vehicle speed command, permitted vehicle speed upper limit value and permitted vehicle speed lower limit value of tolerance set accompanying this original vehicle speed command, and correction signal and target vehicle speed command generated by the vehicle speed command generation device 1. It should be noted that the original vehicle speed command is shown to be delayed by the reference delay time to facilitate understanding in FIG. 5. In other words, the original vehicle speed command and reference vehicle speed command are equal in FIG. 5.

In the original vehicle speed command generated by the driver's aid 5, the point at which a discontinuous change appears in the slope of the original vehicle speed command value may be included, as shown at times t1, t2, t3 and t4 in FIG. 5. For this reason, when inputting the original vehicle speed command to the vehicle speed control device 2 of the automated driving operation apparatus as is, during such a transition in which a discontinuous change appears in the slope of the vehicle speed, the actual vehicle speed overshoots or undershoots from the original vehicle speed command, exhibits unnatural behavior not actually appearing in operation by human, and may depart from the tolerance.

In contrast, the vehicle speed command generation device 1 generates a target vehicle speed command through a step of sending the original vehicle speed command by the driver's aid 5 to the shift processing unit 12; a step of generating the reference vehicle speed command, first-out vehicle speed command and delayed vehicle speed command by delaying this original vehicle speed command, while receiving the original vehicle speed command in the shift processing unit 12; and a step of generating a correction signal using the reference vehicle speed command, first-out vehicle speed command and delayed vehicle speed command in the correction processing unit 16, and correcting the reference vehicle speed command by adding this correction signal to the reference vehicle speed command.

As shown in FIG. 5, in steady state in which the change in slope of the original vehicle speed command value is small, since the correction signal generated by the vehicle speed command generation device 1 becomes substantially 0, the waveform of the target vehicle speed command substantially matches the waveform of the original vehicle speed command.

In contrast, during such a transition that a discontinuous change in the slope of the original vehicle speed command value appears (before and after times t1, t2, t3, t4), the correction signal changes from 0. More specifically, in the case of the slope of the original vehicle speed command value discontinuously changing to the positive side (before and after times t1 and t4), the correction signal changes convexly to the positive side, and in the case of the slope of the original vehicle speed command value discontinuously changing to the negative side (before and after times t2 and t3), the correction signal changes convexly to the negative side. Therefore, the waveform of the target vehicle speed command obtained by summing such a correction signal and reference vehicle speed command becomes smooth during such a transition that a discontinuous change in the slope of the original vehicle speed command appears. For this reason, by inputting the target vehicle speed command generated by the vehicle speed command generation device 1 to the vehicle speed control device 2 of the automated driving operation apparatus, it is possible to prevent the actual vehicle speed from overshooting or undershooting, and thus it is possible to realize operation closer to human than a case of inputting the original vehicle speed command as is.

According to the vehicle speed command generation device 1 of the present embodiment, the following effects are exerted.

(1) The shift processing unit 12 receives the original vehicle speed command sent from the driver's aid 5 and generates the reference vehicle speed command, first-out vehicle speed command and delayed vehicle speed command by delaying this original vehicle speed command by the reference delay time, first delay time and second delay time, and the correction processing unit 16 generates the target vehicle speed command by correcting the reference vehicle speed command using the first-out vehicle speed command and delayed vehicle speed command. Herein, the waveforms of the reference vehicle speed command, first-out vehicle speed command and delayed vehicle speed command are the same as the original vehicle speed command; however, the first-out vehicle speed command changes before the reference vehicle speed command, and the delayed vehicle speed command changes after the reference vehicle speed command. For this reason, by correcting the reference vehicle speed command using this first-out vehicle speed command and delayed vehicle speed command, it is possible to correct the reference vehicle speed command so that the slope of the vehicle speed command value becomes smooth during such transition that a discontinuous change in the slope of the reference vehicle speed command value (i.e. acceleration) appears, and thus generate the target vehicle speed command. For this reason, it is possible to generate the target vehicle speed command such that smooth operation close to human can be realized by the automated driving operation apparatus, without using information related to tolerance. In addition, since the vehicle speed command generation device 1 generates the target vehicle speed command using the reference vehicle speed command, first-out vehicle speed command and delayed vehicle speed command generated by delaying the original vehicle speed command sent form the drivers aid 5, it is possible to generate a target vehicle speed command such that it is possible to realize smooth command by serial processing, while receiving the original vehicle speed command.

(2) With the vehicle speed command generation device 1, the reference delay time is set longer than the first shift time and second shift time. It is thereby possible to generate a target vehicle speed command such that the slope of the vehicle speed command value becomes smooth within the range permitted by tolerance by way of serial processing.

(3) The correction processing unit 16 generates a correction signal for the reference vehicle speed command based on the reference vehicle speed command, first-out vehicle speed command and delayed vehicle speed command, and generates a target vehicle speed command by summing the reference vehicle speed command and the correction signal. It is thereby possible to generate the target vehicle speed command such that it is possible to realize smooth operation close to human by the automated driving operation apparatus, based on the reference vehicle speed command in which the original vehicle speed command is delayed by the reference delay time.

(4) The incremental slope operator 162 calculates the incremental slope value by dividing, by the total shift time 2 Ct, a value arrived at by subtracting the delayed vehicle speed command value from a first-out vehicle speed command value, the differential operator 161 calculates the differential of the value of the reference vehicle speed command, and the integrator 167 generates a correction signal by integrating the value obtained by subtracting the differential from the incremental slope value. It is thereby possible to configure so as not to correct the reference vehicle speed command for a portion having no great change in the slope of the reference vehicle speed command value, and correct the reference vehicle speed command so that this change in slope becomes gentle for a portion in which a great change arises in the slope of the reference vehicle speed command value.

Although a first embodiment of the present invention has been explained above, the present invention is not limited thereto. The configurations of detailed parts may be modified as appropriate with the scope of the gist of the present invention.

Figure 6:
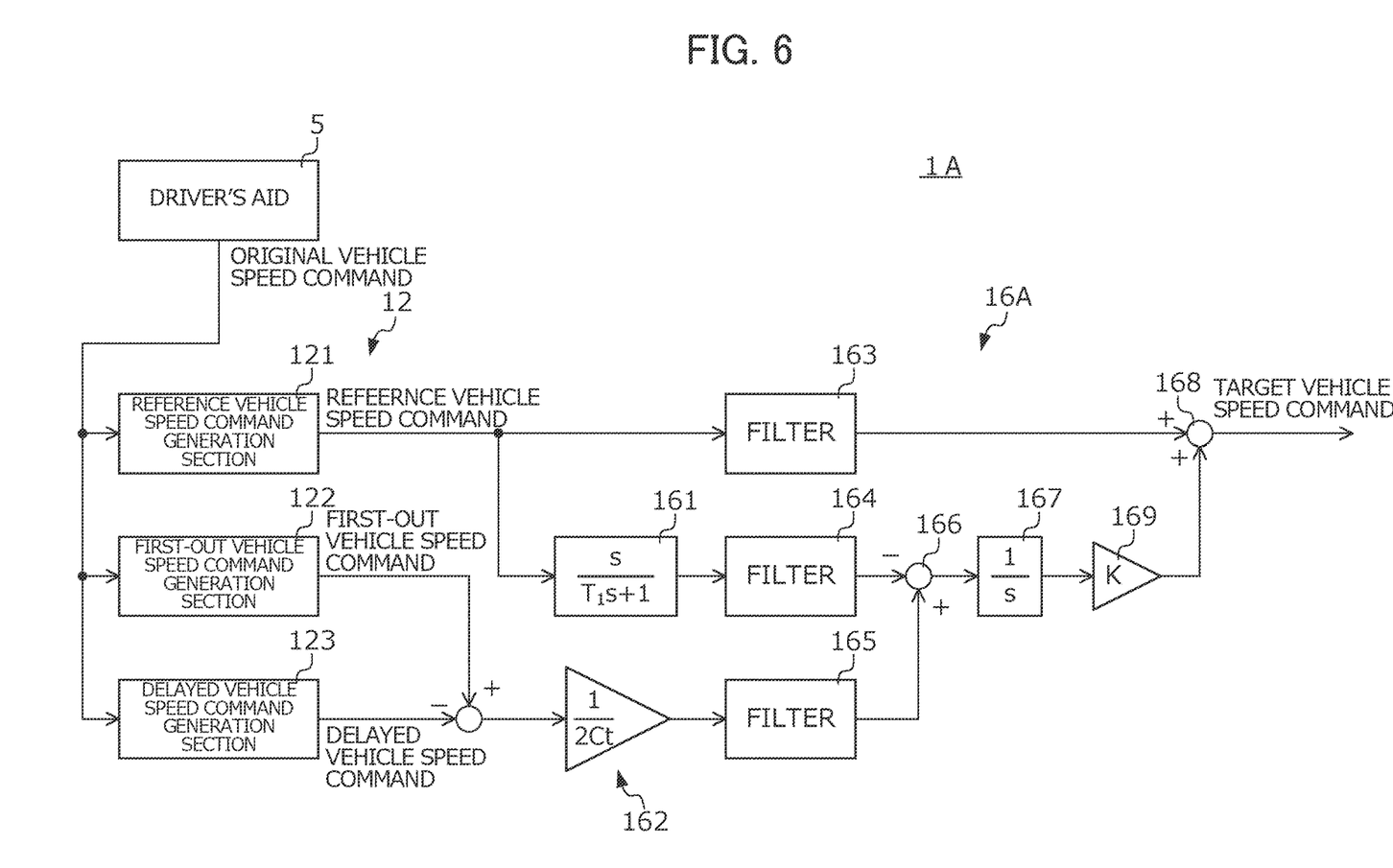
FIG. 6 is a view showing the configuration of a control circuit of a vehicle speed command generation device of a modified example.

FIG. 6 is a view showing the configuration of a control circuit of a vehicle speed command generation device 1A according to a modified example. The vehicle speed command generation device 1 differs in the configuration of a correction processing unit 16A from the vehicle speed command generation device 1 according to the above embodiment. More specifically, the correction processing unit 16A differs in the point of further including a multiplier 169 relative to the correction processing unit 16 shown in FIG. 2.

The integrator 167 calculates the integral of the difference between the incremental slope value calculated in the subtracter 166 and the derivative of the reference vehicle speed command value. The multiplier 169 generates a correction signal by multiplying a predetermined correction constant K by the integral calculated in the integrator 167. The value of this correction factor K is set to any value from 0 to 1. In addition, the value of this correction factor K may be set as a constant, or may be changed along a schedule set in advance.

Figure 7:
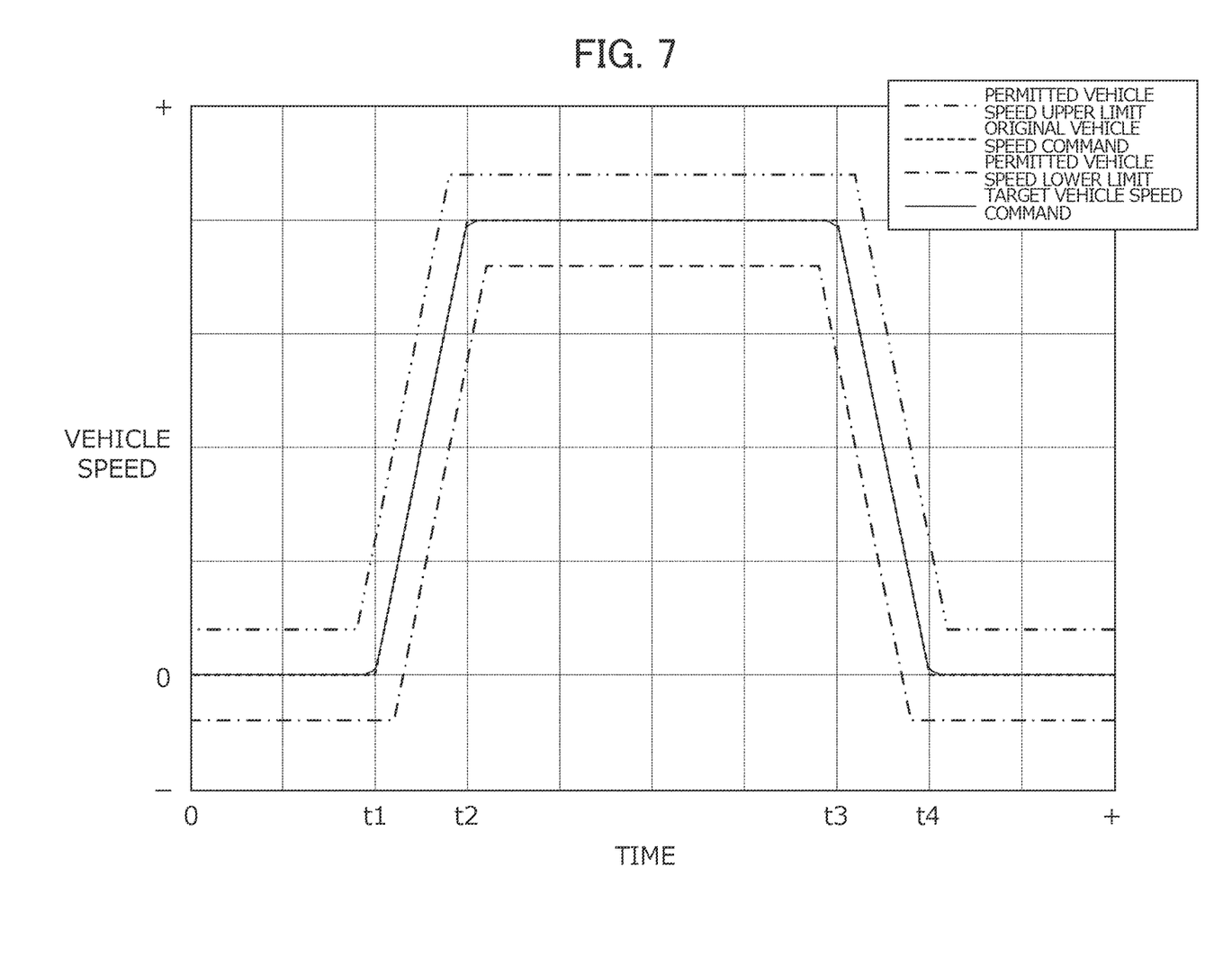
FIG. 7 is a graph showing the waveform of a target vehicle speed command generated by a vehicle speed command generation device of the modified example.

FIG. 7 is a graph showing the waveform of the target vehicle speed command generated by a vehicle speed command generation device 1A of the modified example. FIG. 7 shows the original vehicle speed command, permitted vehicle speed upper limit value and permitted vehicle speed lower limit value of the tolerance set accompanying this original vehicle speed command, and the target vehicle speed command generated by the vehicle speed command generation device 1. In addition, FIG. 7 shows the results in the case of setting the value of the correction factor K to 0.25.

When the value of the correction factor K approaches 1, the waveform of the target vehicle speed command generated by the vehicle speed command generation device 1A approaches the waveform of the target vehicle speed command generated by the aforementioned vehicle speed command generation device 1. In addition, as is evident by comparing between FIGS. 6 and 7, when the value of the correction factor K approaches 0, the waveform of the target vehicle speed command generated by the vehicle speed command generation device 1A approaches the waveform of the reference vehicle speed command (original vehicle speed command).

Therefore, if setting the value of the correction factor K to 1, for example, when a segment exists such that the actual vehicle speed does not overshoot but deviates from the tolerance, it is possible to configure so that the target vehicle command approaches the reference vehicle speed command, and does not deviate from the tolerance, by making the value of the correction factor K approach 0 only within this segment.

According to the vehicle speed command generation device 1A of the modified example, the following effects are exerted.

(5) The integrator 167 calculates the integral of the value obtained by subtracting the derivative from the incremental slope value, and the multiplier 169 generates the correction signal by multiplying the correction factor K of a value between 0 and 1 by the integral. It is thereby possible to configure so as not to correct the reference vehicle speed command for a portion having no great change in the slope of the reference vehicle speed command value, and correct the reference vehicle speed command so that this change in slope becomes gentle for a portion in which a great change arises in the slope of the reference vehicle speed command value. In addition, according to the vehicle speed command generation device 1A, it is possible to adjust the magnitude of the correction signal, by adjusting the value of the correction factor K between 0 and 1. It is thereby possible to make the value of the correction factor K approach 1 in a portion such that overshoot tends to occur, and greatly change the target vehicle speed command from the reference vehicle speed command, and possible to make the value of the correction factor K to approach 0 in a portion such that deviates from the tolerance, and make the target vehicle speed command approach the reference vehicle speed command.

Second Embodiment

Figure 8:
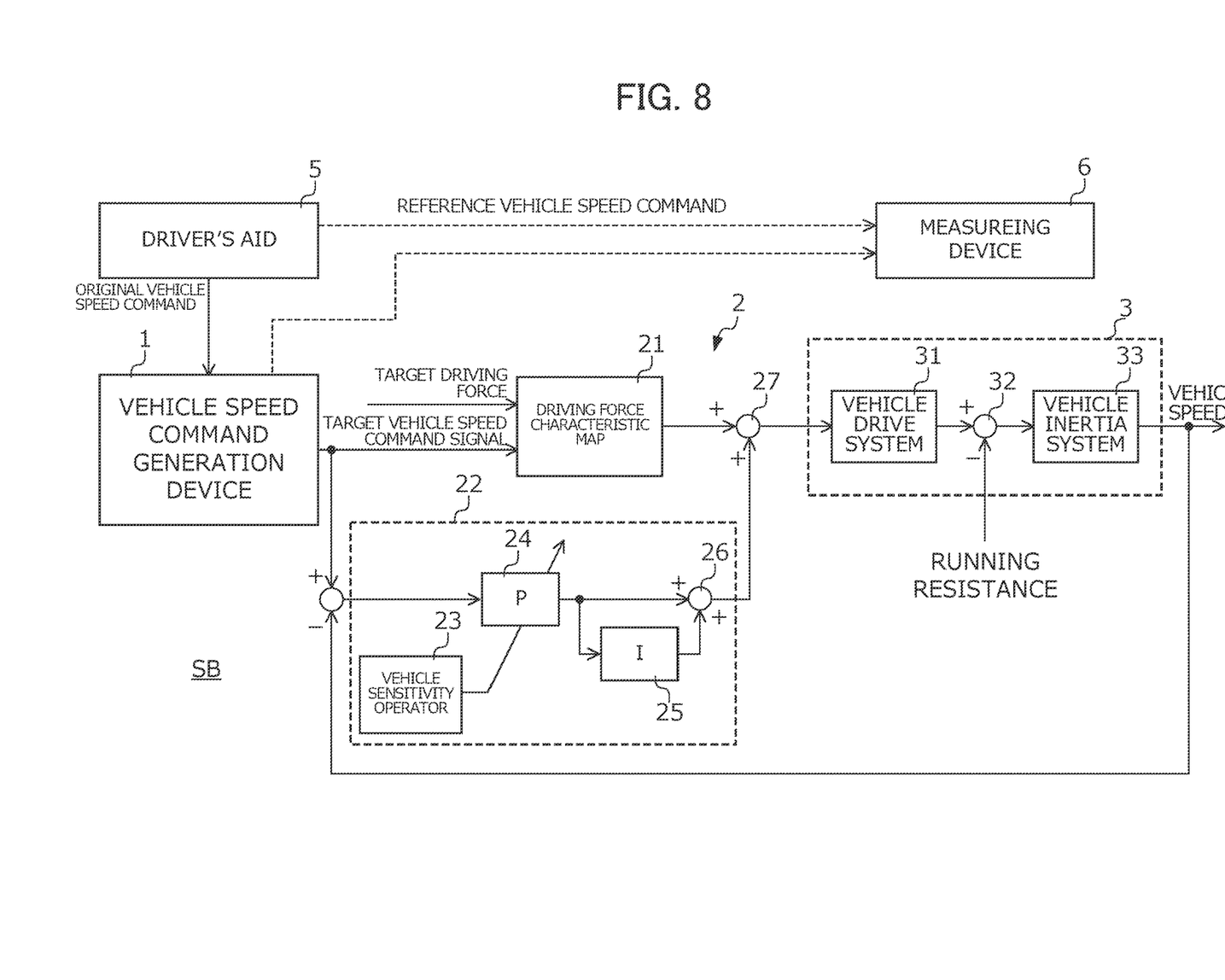
FIG. 8 is a view showing the configuration of a control system of a vehicle test system according to a second embodiment of the present invention.

Next, a second embodiment of the present invention will be explained in detail while referencing the drawings. FIG. 8 is a view showing the configuration of a control system of a vehicle test system SB according to the present embodiment. It should be noted that, in the following explanation of the vehicle test system SB according to the second embodiment, the same reference symbols are assigned for configurations which are identical to the vehicle test system S according to the above-mentioned first embodiment, and detailed explanations thereof are omitted. The vehicle test system SB differs from the vehicle test system S in the point of including a measuring device 6.

The measuring device 6 measures the performance of the vehicle mounted to the chassis dynamometer. The measuring device 6, for example, is an exhaust gas analyzer which measures the amounts of specific components contained in the exhaust gas discharged from the vehicle during travel; however, the present invention is not limited thereto.

In the vehicle test system SB including the above such measuring device 6, generally, the measuring device 6 is made to run synchronously with the original vehicle speed command generated by the driver's aid 5. However, as explained by referencing FIG. 4, since the target vehicle speed command generated by the vehicle speed command generation device 1 is delayed by the reference delay time relative to the original vehicle speed command, when running the measuring device 6 synchronously with the original vehicle speed command, a time difference may arise by the reference delay time, and it may no longer be possible to accurately measure.

Therefore, with the vehicle test system SB according to the present embodiment, the measuring device 6 is made to run synchronously with the reference vehicle speed command generated in the shift processing unit 12 of the vehicle speed command generation device 1. In addition, in the case of the driver's aid 5 including a function of generating an original vehicle speed command and reference vehicle speed command in which this original vehicle speed command is delayed by the reference delay time, the measuring device 6 may be made to run synchronously with the reference vehicle speed command generated by the driver's aid 5. According to the vehicle test system SB related to the present embodiment, it is possible to realize accurate measurement by the measuring device 6, while generating a target vehicle speed command such that can realize smooth operation close to a human by the automated driving operation apparatus by way of the vehicle speed command generation device 1.

EXPLANATION OF REFERENCE NUMERALS

S, SB vehicle test system
1, 1A vehicle speed command generation device
12 shift processing unit
121 reference vehicle speed command generation section
122 first-out vehicle speed command generation section
123 delayed vehicle speed command generation section
16, 16A correction processing unit
161 differential operator
162 incremental slope operator
167 integrator
169 subtracter
2 vehicle speed control device
3 controlled object
5 driver's aid (original vehicle speed command generation device)
6 measuring device

The invention claimed is:

1. A vehicle test system that includes: a vehicle speed control device of an automated driving operation apparatus that, when a vehicle speed command is inputted, operates an accelerator pedal and a brake pedal of a vehicle to realize the vehicle speed command, and a vehicle speed command generation device generating the vehicle speed command to be used by the vehicle speed control device, the vehicle speed command generation device comprising:
a shift processing unit which receives an original vehicle speed command determined in advance, and generates: a reference vehicle speed command in which the original vehicle speed command is delayed by a reference delay time determined in advance; a first-out vehicle speed command in which the original vehicle speed command is delayed by a first delay time determined shorter than the reference delay time; and a delayed vehicle speed command in which the original vehicle speed command is delayed by a second delay time determined longer than the reference delay time; and
a correction processing unit which generates the vehicle speed command by correcting the reference vehicle speed command using the first-out vehicle speed command and the delayed vehicle speed command, and inputs the vehicle speed command to the vehicle speed control device.

2. The vehicle test system according to claim 1, wherein the reference delay time is longer than a first shift time obtained by subtracting the first delay time from the reference delay time, and longer than a second shift time obtained by subtracting the reference delay time from the second delay time.

3. The vehicle test system according to claim 1, wherein the correction processing unit generates a correction signal for the reference vehicle speed command based on the reference vehicle speed command, the first-out vehicle speed command and the delayed vehicle speed command, and generates the vehicle speed command by summing the reference vehicle speed command and the correction signal.

4. The vehicle test system according to claim 3, wherein the correction processing unit includes:
an incremental slope operator which calculates a differential time by subtracting the first delay time from the second delay time, calculates a differential speed by subtracting a value of the delayed vehicle speed command from a value of the first-out vehicle speed command, and calculates an incremental slope value by dividing the differential speed by the differential time;
a differential operator which calculates a derivative of the reference vehicle speed command; and
an integrator which generates the correction signal by integrating a value obtained by subtracting the differential from the incremental slope value.

5. The vehicle test system according to claim 3, wherein the correction processing unit includes:
an incremental slope operator which calculates a differential time by subtracting the first delay time from the second delay time, calculates a differential speed by subtracting a value of the delayed vehicle speed command from a value of the first-out vehicle speed command, and calculates an incremental slope value by dividing the differential speed by the differential time;
a differential operator which calculates a derivative of the reference vehicle speed command;
an integrator which calculates an integral of a value obtained by subtracting the differential from the incremental slope value; and
a multiplier which generates the correction signal by multiplying a correction factor of a value between 0 and 1 by the integral.

6. The vehicle test system according to claim 1, further comprising:
an original vehicle speed command generation device which generates the original vehicle speed command; and
a measuring device which measures performance of the vehicle,
wherein the measuring device operates synchronously with a signal delaying the original vehicle speed command by the reference delay time, or the reference vehicle speed command.

7. A vehicle speed command generation method for a vehicle test system that includes: a vehicle speed control device of an automated driving operation apparatus that, when a vehicle speed command is inputted, operates an accelerator pedal and a brake pedal of a vehicle to realize the vehicle speed command, a vehicle speed command generation device generating the vehicle speed command to be used in the vehicle speed control device, the method comprising steps of:

receiving an original vehicle speed command determined in advance, and generating a reference vehicle speed command in which the original vehicle speed command is delayed by a reference delay time determined in advance, a first-out vehicle speed command in which the original vehicle speed command is delayed by a first delay time determined shorter than the reference delay time, and a delayed vehicle speed command in which the original vehicle speed command is delayed by a second delay time determined longer than the reference delay time;
generating the vehicle speed command by correcting the reference vehicle speed command using the first-out vehicle speed command and the delayed vehicle speed command; and
inputting the vehicle speed command to the vehicle speed control device.

8. The vehicle test system according to claim 2, wherein the correction processing unit generates a correction signal for the reference vehicle speed command based on the reference vehicle speed command, the first-out vehicle speed command and the delayed vehicle speed command, and generates the vehicle speed command by summing the reference vehicle speed command and the correction signal.

9. The vehicle test system according to claim 8, wherein the correction processing unit includes:
an incremental slope operator which calculates a differential time by subtracting the first delay time from the second delay time, calculates a differential speed by subtracting a value of the delayed vehicle speed command from a value of the first-out vehicle speed command, and calculates an incremental slope value by dividing the differential speed by the differential time;
a differential operator which calculates a derivative of the reference vehicle speed command; and
an integrator which generates the correction signal by integrating a value obtained by subtracting the differential from the incremental slope value.

10. The vehicle test system according to claim 8, wherein the correction processing unit includes:
an incremental slope operator which calculates a differential time by subtracting the first delay time from the second delay time, calculates a differential speed by subtracting a value of the delayed vehicle speed command from a value of the first-out vehicle speed command, and calculates an incremental slope value by dividing the differential speed by the differential time;
a differential operator which calculates a derivative of the reference vehicle speed command;
an integrator which calculates an integral of a value obtained by subtracting the differential from the incremental slope value; and
a multiplier which generates the correction signal by multiplying a correction factor of a value between 0 and 1 by the integral.

11. The vehicle test system according to claim 2, further comprising:
an original vehicle speed command generation device which generates the original vehicle speed command; and
a measuring device which measures performance of the vehicle,
wherein the measuring device operates synchronously with a signal delaying the original vehicle speed command by the reference delay time, or the reference vehicle speed command.

12. The vehicle test system according to claim 3, further comprising:
- an original vehicle speed command generation device which generates the original vehicle speed command; and
- a measuring device which measures performance of the vehicle,
- wherein the measuring device operates synchronously with a signal delaying the original vehicle speed command by the reference delay time, or the reference vehicle speed command.

13. The vehicle test system according to claim 4, further comprising:
- an original vehicle speed command generation device which generates the original vehicle speed command; and
- a measuring device which measures performance of the vehicle,
- wherein the measuring device operates synchronously with a signal delaying the original vehicle speed command by the reference delay time, or the reference vehicle speed command.

14. The vehicle test system according to claim 5, further comprising:
- an original vehicle speed command generation device which generates the original vehicle speed command; and
- a measuring device which measures performance of the vehicle,
- wherein the measuring device operates synchronously with a signal delaying the original vehicle speed command by the reference delay time, or the reference vehicle speed command.

15. The vehicle test system according to claim 8, further comprising:
- an original vehicle speed command generation device which generates the original vehicle speed command; and
- a measuring device which measures performance of the vehicle,
- wherein the measuring device operates synchronously with a signal delaying the original vehicle speed command by the reference delay time, or the reference vehicle speed command.

16. The vehicle test system according to claim 9, further comprising:
- an original vehicle speed command generation device which generates the original vehicle speed command; and
- a measuring device which measures performance of the vehicle,
- wherein the measuring device operates synchronously with a signal delaying the original vehicle speed command by the reference delay time, or the reference vehicle speed command.

17. The vehicle test system according to claim 10, further comprising:
- an original vehicle speed command generation device which generates the original vehicle speed command; and
- a measuring device which measures performance of the vehicle,
- wherein the measuring device operates synchronously with a signal delaying the original vehicle speed command by the reference delay time, or the reference vehicle speed command.

* * * * *